United States Patent
Buijtenhuijs et al.

(10) Patent No.: US 6,764,603 B2
(45) Date of Patent: Jul. 20, 2004

(54) MATERIAL FOR EXTRACTING HYDROPHOBIC COMPONENTS DISSOLVED IN WATER

(75) Inventors: Frederik Albert Buijtenhuijs, Arnhem (NL); Johanne Josef Pragt, Dieren (NL); Elwin Schomaker, Velp (NL)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/820,546

(22) Filed: Mar. 29, 2001

(65) Prior Publication Data

US 2001/0020602 A1 Sep. 13, 2001

Related U.S. Application Data

(63) Continuation of application No. 08/381,828, filed as application No. PCT/EP93/02029 on Jul. 29, 1993, now abandoned.

(30) Foreign Application Priority Data

Aug. 7, 1992 (NL) .............................................. 9201418

(51) Int. Cl.⁷ .............................. B01D 15/00; C02F 1/28
(52) U.S. Cl. ...................... 210/671; 210/673; 210/680; 210/693
(58) Field of Search ................................ 210/671, 673, 210/680, 693, 924

(56) References Cited

U.S. PATENT DOCUMENTS

| | | | |
|---|---|---|---|
| 2,367,384 A | 1/1945 | Tymstra et al. | 210/680 |
| 3,147,216 A | 9/1964 | Oemler | 210/693 |
| 3,308,073 A | 3/1967 | Kepple | 521/64 |
| 3,378,507 A | 4/1968 | Sargent et al. | 521/64 |
| 3,518,183 A | 6/1970 | Evans | 210/693 |
| 3,607,793 A | 9/1971 | Mahlman | 521/61 |
| 3,617,566 A | 11/1971 | Oshima et al. | 210/693 |
| 3,674,683 A | 7/1972 | Rainer | 210/693 |
| 3,676,357 A | 7/1972 | Ciuti et al. | 502/402 |
| 3,770,627 A | 11/1973 | Alquist et al. | 210/693 |
| 3,886,067 A | 5/1975 | Miranda | 210/680 |
| 4,039,489 A | 8/1977 | Fletcher et al. | 521/63 |
| 4,115,266 A | 9/1978 | Oshima | 210/786 |
| 4,237,237 A | 12/1980 | Jarre et al. | 521/128 |
| 4,247,498 A | 1/1981 | Castro | 264/41 |
| 4,276,179 A | 6/1981 | Soehngen | 210/679 |
| 4,302,337 A | * 11/1981 | Larson et al. | 210/680 |
| 4,454,198 A | 6/1984 | Fickel et al. | 428/402 |
| 4,470,909 A | 9/1984 | Bright | 210/634 |
| 4,502,975 A | 3/1985 | Kobayashi et al. | 516/102 |
| 4,537,877 A | 8/1985 | Ericsson | 502/402 |
| 4,594,207 A | 6/1986 | Josefiak et al. | 264/41 |
| 4,842,745 A | 6/1989 | Weiler et al. | 210/679 |
| 5,135,660 A | 8/1992 | Chromecek et al. | 210/671 |
| 5,140,095 A | 8/1992 | Guaita et al. | 528/220 |
| 5,198,507 A | 3/1993 | Kohn et al. | 525/432 |

FOREIGN PATENT DOCUMENTS

| | | |
|---|---|---|
| DE | 3632360 A1 | 3/1988 |
| EP | 0106970 A1 | 5/1984 |
| EP | 0248429 A2 | 12/1987 |
| FR | 2251525 | 6/1975 |
| GB | 1535481 | 12/1978 |
| GB | 2115425 A | 9/1983 |
| NL | 7701328 | 8/1977 |
| WO | WO 94/03249 | * 2/1994 |

OTHER PUBLICATIONS

3632360A1, date Mar. 31, 1988, Germany Abstract.

* cited by examiner

Primary Examiner—Ivars C. Cintins
(74) Attorney, Agent, or Firm—Dilworth & Barrese, LLP

(57) ABSTRACT

A method for the extraction of hydrophobic constituents, such as benzene, toluene, xylene and/or chlorinated hydrocarbons, from an aqueous solution, involving the steps of contacting said solution with a porous, preferably dimensionally stable granular or powdery material, of which the pores have a size of from 0.1 to 50 μm and contain a hydrophobic substance with affinity for the hydrophobic constituents to be extracted, which granular or powdery material has a particle size of from 0.1 to 10 mm, and is wetted more readily by the hydrophobic substance immobilized in the pores than by the aqueous solution to be treated, and regenerating the product of step a), essentially without the granular or powdery material being freed from the hydrophobic substance, by removal of the hydrophobic constituents.

13 Claims, No Drawings

MATERIAL FOR EXTRACTING HYDROPHOBIC COMPONENTS DISSOLVED IN WATER

This application is a continuation of application Ser. No. 08/381,828 filed Mar. 16, 1995, now abandoned, which is the U.S. national stage of PCT/EP93/02029, filed Jul. 29, 1993.

The invention relates to the use of a porous, preferably dimensionally stable, material for the extraction of hydrophobic constituents, such as benzene, toluene, xylene and/or chlorinated hydrocarbons, from an aqueous solution, the material containing a hydrophobic substance exhibiting great affinity for the constituents to be extracted from the water.

Such a use, with a porous material being employed, was earlier described in GB-A-1 535 481. The porous material employed in this document consists of mineral carriers which are inert with respect to water, to the hydrophobic substance to be used as extractant, and to the compound to be extracted. Examples of suitable mineral carriers mentioned are pumice, kieselguhr, bauxite, alumina, carbon, or silicates. The particles preferably have a size in the range of 0.1 mm to 5 cm. It is stated that the pore size is critical only to the extent that it should be large enough to permit penetration of the compound to be extracted, of the extraction solvent, and of the regeneration liquid.

In actual practice, using the known materials for the aforementioned extraction process is attended with major drawbacks because the hydrophobic substances absorbed in them are easily displaced by water, especially when a packed bed is employed. In consequence, the water to be extracted or purified is in fact contaminated rather than decontaminated by these substances.

The invention now provides for the use of a porous material with a hydrophobic substance absorbed therein which, a significant increase in the capacity per volume unit notwithstanding, does not give rise to stability problems, not even when utilised on an industrial scale.

The invention consists in that when a porous material of the known type mentioned in the opening paragraph is used, it has a surface which will be wetted more readily by the hydrophobic substance immobilized in the pores of an average diameter in the range of 0.1 to 50 $\mu$m than by the aqueous solution, with the proviso that at least 60% of the hydrophobic substance can be extracted from the pores by a liquid wholly made up of the constituents to be extracted.

To determine the average pore diameter advantageous use is made of mercury porosimetry in accordance with ASTM D 4248-83.

According to the invention, preference is given to the use of a porous material at least 85% of which can be extracted from the pores by a liquid wholly composed of the constituents to be extracted.

It is to be considered extremely surprising that by the use of a porous material having a hydrophobic surface as well as an average pore diameter within the given range both the stability and the extraction capacity are so enhanced that now, for the first time, application on an industrial scale has become feasible.

It was found that, in general, optimum results can be obtained when using a material having an average pore diameter in the range of 0.2 to 15 $\mu$m.

The hydrophobic immobilized material may be solid matter as well as a liquid. If the immobilized material is a solid, preference is given to a polymer which swells in the hydrophobic substance to be extracted. Examples of polymers which are suitable for use within the framework of the invention include polymethyl(meth)acrylate, styrene-acrylonitrile copolymer, and acrylonitrile-butadiene-styrene copolymer, all of which may be partially cross-linked or not. Preference is given in this case to polystyrene. If the immobilized material is a liquid, use is made of a liquid having the greatest possible affinity for the hydrophobic constituents to be extracted. Needless to say, this liquid should be virtually insoluble in the aqueous solution to be extracted and be so immobilized in the porous material that it cannot flow from the porous structure. Within the framework of the invention preference is given to the use of a liquid in the form of a glycerol ester of one or more, preferably unsaturated, fatty acids. In general, favourable results are attained if the immobilized liquid is an oil, such as palmitic oil, olive oil, peanut oil, paraffinic oil, fish oil such as herring oil, linseed oil, and, in particular, soybean oil and/or castor oil.

Generally, favourable results are attained when using a material of which at least 15 vol. % of the pores is filled with the substance immobilized therein, with optimum results being obtained using a material of which at least 50 vol. % and not more than 95 vol. % of the pores is filled with the substance immobilized therein. Completely filled up pores may cause problems on account of swelling (solid matter) or expansion (liquid), which may lead to the dimensions of the porous material being interfered with or to the immobilized liquid bursting the pores. In the case of porous materials wholly filled up with a liquid hydrophobic substance being used, these difficulties can easily be overcome by mixing the filled material with unfilled (porous) material, so that the generated excess can be absorbed during extraction. Alternatively, when a packed bed is used, the unfilled (porous) material may be deposited at the two ends of the bed as separate boundary layers. When these types of steps are taken, 100 vol. %-filled materials may also be employed.

The porous material preferably is organic in origin. However, it is also possible to use a porous inorganic material, providing it has a hydrophobic surface, e.g., through the application of a coating.

Within the framework of the invention preference is given to the use of natural and synthetic organic materials, the latter materials being preferred for reasons of reproducibility. Examples of synthetic organic materials include porous polymers, more particularly those of which the preparation is disclosed in U.S. Pat. No. 4,247,498.

Examples of polymers deemed more or less suitable for use in the present invention include:

low pressure polyethylene, high pressure polyethylene, polypropylene, polystyrene, acrylonitrile-butadiene-styrene terpolymers, styrene-acrylonitrile copolymers, styrene-butadiene copolymers, poly(4-methyl-pentene-1), and polybutene.

Optimum results were attained by employing polyolefin based polymers, with preference being given to the use of a polypropylene based porous material.

The porous polymer is generally used in the form of grains having an average particle diameter of 0.1 to 10 mm. Alternatively, the polymer may be employed in the granulated form, as well as in the form of membranes, fibres which may be hollow or not, etc. When in the form of a granulate or a powder, the porous polymer may be used in a packed bed, a fluidised bed, or a tank with stirring. Fibres which may be hollow or not are used in the form of fabrics and non-wovens, respectively.

In one embodiment, the porous material maybe obtained by dissolving the polymer in a solvent with heating, cooling the solution to obtain a solidified mass, and the mechanical diminution of the solidified mass if so desired.

Particularly when a glycerol ester of one or more unsaturated fatty acids is employed to extract aromatic compounds from aqueous solutions, preference is given to a porous material obtained by a process such as described in DE-A-32 05 289. By this process a structure may be obtained which has pores of an average diameter in the range of 0.1 to 50 $\mu$m. Especially favourable results may be obtained when using polypropylene as porous material and soybean oil/castor oil as hydrophobic substance.

Needless to say, the materials according to the invention are not just suitable for extracting aromatic waste matter from aqueous solutions; extracting useful constituents such as biologically active constituents from usually highly dilute aqueous solutions is also within the bounds of possibility.

Generally, the procedure used to prepare the extracting material according to the invention is as follows: first, 5–90 wt. % of a polymer is dissolved, with heating, at a temperature above the upper critical decomposition temperature Tc in 10–95 wt. % of a mixture of two liquid and miscible compounds A and B, the mixing ratio of A to B being so selected as to give decomposition on cooling, resulting in a polymer-rich and a polymer-poor phase. On further lowering of the temperature this decomposition structure is then fixed prior to the completion of the phase separation, due to vitrification or crystallisation of the polymer, resulting in a porous polymer material filled with the mixture of compounds A and B which is pre-eminently suited to be used within the framework of the invention, either as such or after diminution if so desired.

The invention will be illustrated with reference to the following examples, which, of course, are not to be construed as limiting in any manner the scope of the invention.

EXAMPLE I

A glass column of 2 m in length and with a diameter of 23 cm, which at its top and bottom was closed up with perforated screens having apertures of 1 mm in diameter, was filled over a length of 180 cm with a porous polypropylene powder filled with oil (hydrophobic extractant).

Two experiments were carried out, the first one making use of polypropylene powder partially filled with soybean oil, the second one employing polypropylene powder wholly filled with soybean/castor oil. The two powders also differed from each other in terms of particle size distribution.

The powders in question had the following specifications:

|  | Powder I | Powder II |
| --- | --- | --- |
| particle diameter | 350–1000 $\mu$m | 100–2000 $\mu$m |
| porosity | 3 ml/g | 3 ml/g |
| average pore diameter | 10 $\mu$m | 10 $\mu$m |
| degree of substitution with oil | 60 wt. % | 72 wt. % |

In order to prevent the fine polypropylene powder from clogging up the apertures of the perforated screens, in each of the two arrangements the powder was bounded on either side by a 10 cm thick layer of the same material in the form of unfilled granules of 3–4 mm in diameter.

Powder I (7.38 kg) was filled with 11.06 kg of soybean oil to give a total of 18.44 kg.

Powder II (8.04 kg) was filled with 20.51 kg of soybean oil/castor oil to give a total of 28.55 kg.

The rate of flow of the liquid was 157 l per hour at a temperature of 240° C. The average overall aromatics content in the water to be purified was 840 ppm, the benzene content was 630 ppm, the toluene content 60 ppm.

In the case of powder I, the aromatics concentration in the effluent during an extraction process lasting well over 12 hours could not be measured. By then, the material had absorbed about 6.5 wt. % of benzene and 8.5 wt. % of aromatics, respectively.

In the case of powder II, the aromatics concentration in the effluent during an extraction process lasting well over 20 hours could not be measured. By then, the material had absorbed about 7 wt. % of benzene and 9 wt. % of aromatics, respectively. The point of saturation was reached after about 45 hours, when more than 15 wt. % of aromatics had been absorbed.

The aromatics content was measured intermittently by IR spectroscopy in accordance with ASTM D3921-85, the benzene content by liquid chromatography.

EXAMPLE II

The column of Example I was now filled with 28.3 kg of powder II, which was bounded on either side by a 5–10 cm thick layer of unfilled polypropylene granules. The rate of flow of the liquid was 300 l per hour at a temperature in the range of 11° to 13° C. The water to be treated had the following influent concentrations:

| chloroform | 0.5 ppm |
| --- | --- |
| carbon tetrachloride | 32 ppm |

After 4 hours in the loaded state, with the contaminated water flowing upwards from the bottom, the column was regenerated with 103° C. steam for 4 hours, with the steam being passed through the column in opposite direction to the water. The rate of flow of the steam was 4 kg per hour. The subsequent periods of loading also were 4 hours each. After eleven of such loadings the efficiency of the column continued unchanged. The effluent concentrations of the treated water were measured by means of gas chromatography using an electron capture detector (ECD) and found to be below the detection limit for chloroform and carbon tetrachioride of<10 ppb (parts per billion), except that in the case of carbon tetrachloride values<60 ppb were measured occasionally.

After condensation of the steam, the chloroform and carbon tetrachloride were drawn off from a liquid separator as lower layer.

EXAMPLE III

In a manner analogous to that disclosed in Example I, two glass columns of 2 m in length and 23 cm in diameter were installed. These columns likewise were closed up at the top and the bottom with perforated screens having apertures of 1 mm in diameter. In order to achieve better distribution over the columns of the powder to be introduced the columns were filled with stainless steel Pall® rings of 15 mm in diameter before being filled over a length of 190 cm with porous powder completely filled up with soybean/castor oil. In order to prevent clogging up of the perforated screens, the powder was bounded on either side by a 5–10 cm thick layer of identical material in the form of unfilled granules having a diameter of 3–4 mm. The specification of the powder was as follows:

| | |
|---|---|
| particle diameter | 350–1000 μm |
| porosity | 3 ml/g |
| average pore diameter | 10 μm |
| degree of substitution with oil | 72 wt. % |

The amounts of powder differed per column: column 1 held 24.4 kg and column 29.4 kg.

The columns were loaded alternately, with the water to be treated being pumped from the bottom upwards and regeneration with 105° C. atmospheric steam taking place from the top downwards. The rate of flow of the steam was 4 kg per hour.

After 32 loadings and regenerations the efficiency of the columns proved unchanged.

The rate of flow of the liquid was 150 l per hour at a temperature of 60° to 130° C. The water to be treated had the following influent concentrations:

| | |
|---|---|
| dichloromethane | 195 ppm |
| chloroform | 39 ppm |
| dichloroethane | 32 ppm |
| benzene | 272 ppm |
| toluene | 137 ppm |

The effluent concentrations were measured by means of gas chromatography using an electron capture detector (for chlorinated hydrocarbons) and flame ionisation (for benzene and toluene), respectively, and found to be below the detection limits for chloroform, dichloroethane, benzene, and toluene of 10 ppb (for chloroform and dichloroethane) and 1 ppb (for benzene and toluene), respectively. The value measured for dichloromethane each time was<0.6 ppm.

EXAMPLE IV

In a manner analogous to that disclosed in Example III, two columns were filled with Pall® rings, which this time had a diameter of 25 mm and were made of polypropylene. The columns were filled over a length of 180–190 cm, column 1 being filled with 28.3 kg of powder and column 2 with 23.8 kg. In order to prevent clogging up of the perforated screens, the powder was bounded on either side by a 5–10 cm thick layer of unfilled polypropylene granules having a diameter of 3–4 mm. The regeneration was carried out at a rate of flow of the steam of 2 kg per hour. After 11 loadings and regenerations the efficiency of the columns proved unchanged. The rate of flow of the liquid was 150 l per hour at a temperature of 15° to 20° C. The water to be treated had the following influent concentrations:

| | |
|---|---|
| 1,1-dichloroethane | 2–3 ppm |
| cis-1,2-dichloroethane | 30–50 ppm |
| 1,1,1-trichloroethane | 1–8 ppm |
| trichloroethene | 0.1–0.3 ppm |

Again, the effluent concentrations were measured by means of gas chromatography using ECD and found to be below the detection limits for said solvents, which were as follows:

| | |
|---|---|
| 1,1-dichloroethane | <50 ppb |
| cis-1,2-dichloroethene | <150 ppb |
| 1,1,1-trichloroethane | <1 ppb |
| trichloroethene | <1 ppb |

After condensation of the steam the organic substances were drawn off from a liquid separator as tower layer.

EXAMPLE V

In a manner analogous to that disclosed in Example IV, two columns were filled with Pall® polypropylene rings of 25 mm in diameter. Next, the columns were filled, over a length of 170 cm, with porous unfilled polypropylene powder. In order to prevent clogging up of the perforated screens, the powder was founded on either side by a 10–20 cm thick layer of unfilled polypropylene granules having a diameter of 3–4 mm.

The specification of the powder was as follows:

| | |
|---|---|
| particle diameter | 350–1000 μm |
| porosity | 3 ml/g |
| average pore diameter | 10 μm |
| degree of substitution with oil | 0 wt. % |

Column 1 contained 7.22 kg of unfilled powder, column 2 held 7.26 kg. First, xylene was passed through the columns until the pores were wholly filled with xylene and there was xylene sticking to the powder particles.

Next, there was alternate loading of the columns, with the water to be treated again being pumped through the column from the bottom upwards. The regenerant used was xylene of 20° to 50° C., which was passed through the column from the top downwards. The rate of flow of the xylene was 55 l per hour. After being regenerated, the columns were emptied with nitrogen, with the powder retaining 30 kg of xylene as extractant.

The rate of flow of the waste water to be treated was 150 l per hour at a temperature of 20° to 50° C. The water to be treated had the following influent concentrations:

| | |
|---|---|
| o-cresol | 70–250 ppm |
| 2-methyl-4-chlorophenoxyacetic acid | 50–160 ppm |
| 2,4-dichlorophenoxyacetic acid | 1–20 ppm |
| 6-chloro-o-cresol | 50–200 ppm |
| 4-chloro-o-cresol | 90–200 ppm |
| 2-(2,4-dichlorophenoxy)propionic acid | 4–7 ppm |
| 2-(2-methyl-4-chlorophenoxy)propionic acid | 3–13 ppm |
| 4,6-dichloro-o-cresol | 7–16 ppm |

Measurement of the effluent concentrations this time was by means of liquid chromatography using UV detection. The two columns had the same effluent compositions, with the measured concentrations always being lower than the following values:

| | |
|---|---|
| o-cresol | <1 ppm |
| 2-methyl-4-chlorophenoxyacetic acid | <1 ppm |

-continued

| | |
|---|---|
| 2,4-dichlorophenoxyacetic acid | <0.4 ppm |
| 6-chloro-o-cresol | <0.5 ppm |
| 4-chloro-o-cresol | <0.5 ppm |
| 2-(2,4-dichlorophenoxy)propionic acid | <0.2 ppm |
| 2-(2-methyl-4-chlorophenoxy)propionic acid | <0.2 ppm |
| 4,6-dichloro-o-cresol | <0.1 ppm |

What is claimed is:

1. A method for the extraction of hydrophobic constituents from an aqueous solution, comprising the steps of:
   a. contacting said solution with a porous, dimensionally stable granular or powdery material, of which the pores have a size of from 0.1 to 50 $\mu$m and contain an immobilized hydrophobic substance with affinity for the hydrophobic constituents to be extracted, which granular or powdery material has a particle size of from 0.1 to 10 mm, and is wetted more readily by the hydrophobic substance immobilized in the pores than by the aqueous solution to be treated, and
   b. regenerating the product of step a), essentially without the granular or powdery material being freed from the hydrophobic substance, by removal of the hydrophobic constituents.

2. A method according to claim 1, wherein steam is used in step b) to remove the hydrophobic constituents.

3. A method according to claim 1, wherein steps a) and b) are repeated.

4. A method according to claim 1, wherein the pore size of the porous, preferably dimensionally stable granular or powdery material is from 0.2 to 15 $\mu$m.

5. A method according to claim 1, wherein the immobilized hydrophobic substance is a polymer which swells in the hydrophobic constituents to be extracted.

6. A method according to claim 1, wherein the immobilized substance is polystyrene.

7. A method according to claim 1, wherein the immobilized substance is a liquid.

8. A method according to claim 1, wherein the immobilized substance is a glycerol ester of one or more optionally unsaturated fatty acids.

9. A method according to claim 8, wherein the immobilized glycerol ester is soybean oil and/or castor oil.

10. A method according to claim 1, wherein the porous material is a polyolefin.

11. A method according to claim 1, wherein the porous material is polypropylene.

12. A method according to claim 1, wherein the porous material was obtained by dissolving a polymer in a solvent with heating, cooling the solution to obtain a solidified mass, and the mechanical diminution of the solidified mass.

13. A method according to claim 12, wherein the polymer is polypropylene and the solvent is soybean oil and/or castor oil.

* * * * *